(12) United States Patent
Harnod et al.

(10) Patent No.: US 12,484,833 B2
(45) Date of Patent: Dec. 2, 2025

(54) CARDIAC DIAGNOSTIC METHOD, NON-TRANSITORY COMPUTER-READABLE MEDIUM AND SYSTEM

(71) Applicant: PHYSIOLGUARD CORPORATION LTD, New Taipei (TW)

(72) Inventors: Zeus Harnod, New Taipei (TW); Hsiang-Chih Chang, New Taipei (TW); Cyuan-Cin Liu, New Taipei (TW)

(73) Assignee: PHYSIOLGUARD CORPORATION LTD, New Taipei (TW)

( * ) Notice: Subject to any disclaimer, the term of this patent is extended or adjusted under 35 U.S.C. 154(b) by 188 days.

(21) Appl. No.: 18/359,912

(22) Filed: Jul. 27, 2023

(65) Prior Publication Data

US 2024/0032847 A1 Feb. 1, 2024

(30) Foreign Application Priority Data

Jul. 28, 2022 (TW) .................................. 111128355

(51) Int. Cl.
*A61B 5/367* (2021.01)
*A61B 5/00* (2006.01)
*A61B 5/346* (2021.01)
*G16H 50/20* (2018.01)
*G16H 50/50* (2018.01)

(52) U.S. Cl.
CPC .............. *A61B 5/367* (2021.01); *A61B 5/346* (2021.01); *A61B 5/7267* (2013.01); *G16H 50/20* (2018.01); *G16H 50/50* (2018.01)

(58) Field of Classification Search
CPC ....... A61B 5/346; A61B 5/367; A61B 5/7267; G16H 40/63; G16H 50/20; G16H 50/50
See application file for complete search history.

*Primary Examiner* — Scott Luan

(57) ABSTRACT

A cardiac diagnostic method includes the following steps: providing an electrocardiogram (ECG) signal; obtaining a body surface potential vector according to the ECG signal; calculating the body surface potential vector and a pre-created mapping tensor to obtain a cardiac potential vector, wherein the mapping tensor is obtained according to a plurality of abnormal positions and a plurality of degree of abnormalities generated by a reference heart; and classifying the abnormal positions and the degree of abnormalities of a detected heart corresponding to the ECG signal according to the cardiac potential vector. In addition, the present disclosure further provides a non-transitory computer-readable medium and system that can operate the above-mentioned cardiac diagnostic method.

20 Claims, 10 Drawing Sheets

CARDIAC DIAGNOSTIC METHOD, NON-TRANSITORY COMPUTER-READABLE MEDIUM AND SYSTEM

CROSS-REFERENCE TO RELATED APPLICATION

This non-provisional application claims priority under 35 U.S.C. § 119 (a) on patent application No. 111128355 filed in Taiwan, R.O.C. on Jul. 28, 2022, the entire contents of which are hereby incorporated by reference.

BACKGROUND OF THE INVENTION

1. Field of the Invention

The present disclosure provides a cardiac diagnostic method, a non-transitory computer-readable medium and system, and in particular to a cardiac diagnostic method suitable for early prediction and treatment course tracking and a non-transitory computer-readable medium and system that can operate the above-mentioned cardiac diagnostic method.

2. Description of the Related Art

Cardiovascular-related diseases have been among the top ten causes of death at home and abroad for many years, including myocardial infarction and heart failure. For myocardial infarction, cardiac catheterization is generally used in the diagnosis, in which a wound about the size of a coin is cut from the inguinal canal or armpit of a test subject, and then the catheter is extended along the vein into the myocardial position to be detected, and the blood vessels and the inside of the heart are detected by a contrast media or endoscopy, or by non-invasive means such as nuclear photography, computed tomography, cardiac ultrasound. In addition, the ECG data of the test subject at stillness, rest or exercise can also be recorded and judged.

BRIEF SUMMARY OF THE INVENTION

However, because cardiac catheterization is an invasive test, the procedure takes longer and is more costly, and patients need a long recovery time. In addition, whether it is cardiac catheterization, nuclear photography, computed tomography or cardiac ultrasound, it requires an exclusive detection space and equipment in the hospital, as well as the operation and interpretation of test results by professional medical personnel, which not only increases the required cost of detection, but also reduces the convenience of detection.

On the other hand, although electrocardiogram can be used for routine detection in clinical practice, the existing ECG information is only for some symptoms of acute myocardial infarction, and cannot provide effective information for atypical myocardial infarction or the early symptoms.

The inventor devoted himself to careful research and developed a cardiac diagnostic method that can classify the abnormal positions and the degree of abnormalities of a detected heart by an electrocardiogram signal, so as to achieve convenience, reduce the cost of detection, reduce the dependence of professional manpower, and be suitable for early prediction and treatment course tracking.

The present disclosure provides a cardiac diagnostic method, including the following steps: providing an electrocardiogram (ECG) signal; obtaining a body surface potential vector according to the ECG signal; calculating the body surface potential vector and a pre-created mapping tensor to obtain a cardiac potential vector, wherein the mapping tensor is obtained according to a plurality of abnormal positions and a plurality of degree of abnormalities generated by a reference heart; and classifying the abnormal positions and the degree of abnormalities of a detected heart corresponding to the ECG signal according to the cardiac potential vector.

In one embodiment, the reference heart described above is a virtual heart, and the cardiac diagnostic method further includes the following steps: creating a model of the virtual heart; simulating different degree of abnormalities occurring at different positions of the model and generating a plurality of sample signals; and classifying the sample signals, generating a plurality of corresponding modal vectors, and creating the mapping tensor according to the modal vectors.

In one embodiment, the cardiac diagnostic method further includes the following steps: determining at least one modal vector corresponding to the body surface potential vector in these modal vectors by machine learning; obtaining at least one weight eigenvalue and at least one corresponding weight vector of the body surface potential vector on the modal vector; and combining the weight eigenvalues with the weight vectors to obtain the cardiac potential vector.

In one embodiment, the above-described machine learning determines the modal vector by sparse representation classification, and the cardiac diagnostic method obtains the weight eigenvalues and the weight vectors by coordinate descent.

In one embodiment, the cardiac diagnostic method further includes the following steps: pre-processing the electrocardiogram signal to obtain a plurality of local potential signals, wherein the number of local potential signals is the same as the number of leads of the ECG signal; and extracting at least one eigenvalue for each of these local potential signals, and obtaining the body surface potential vector according to the eigenvalues.

In one embodiment, the eigenvalues include an amplitude value of J point, a minimum amplitude value of T wave, a maximum amplitude value of T wave, an amplitude value of a first potential point and an amplitude value of a second potential point of a corresponding local signal in these local signals, wherein the first potential point is a potential point that is 0.25 times as long as a J-T interval from J point on a S-T segment of the local signal, and the second potential point is a potential point that is 0.5 times as long as the J-T interval from J point on the S-T segment of the local signal.

In one embodiment, the reference heart described above is a virtual heart, and the cardiac diagnostic method further includes the following step: creating a three-dimensional virtual heart image according to the abnormal position and the degree of abnormality of the virtual heart.

In one embodiment, the cardiac diagnostic method further includes the following step: projecting the three-dimensional virtual heart image to a plane and filtering to obtain a two-dimensional heart partition image.

Besides, the present disclosure further provides a non-transitory computer-readable medium for storing instructions, when a computing device executes the non-transitory computer-readable medium, the computing device can perform the operations corresponding to the above-described cardiac diagnostic method.

Besides, the present disclosure further provides a system, including a processor and a memory, the memory is coupled to the processor and for storing a plurality of instructions, these instructions may be executed by the processor so that the processor performs the operations corresponding to the above-described cardiac diagnostic method.

Accordingly, the cardiac diagnostic method of the present disclosure can calculate the electrocardiogram signal and a pre-created mapping tensor to classify the abnormal position and the degree of abnormality of the detected heart, thereby improving the convenience of diagnosis, reducing detection manpower and cost, so as to be suitable for early prediction and treatment course tracking.

In order to facilitate the above features and advantages of the present disclosure to be more obvious and easy to understand, embodiments specially given together with the attached drawings for the detailed description of the present disclosure are provided as below.

DETAILED DESCRIPTION OF THE INVENTION

Figure 1:
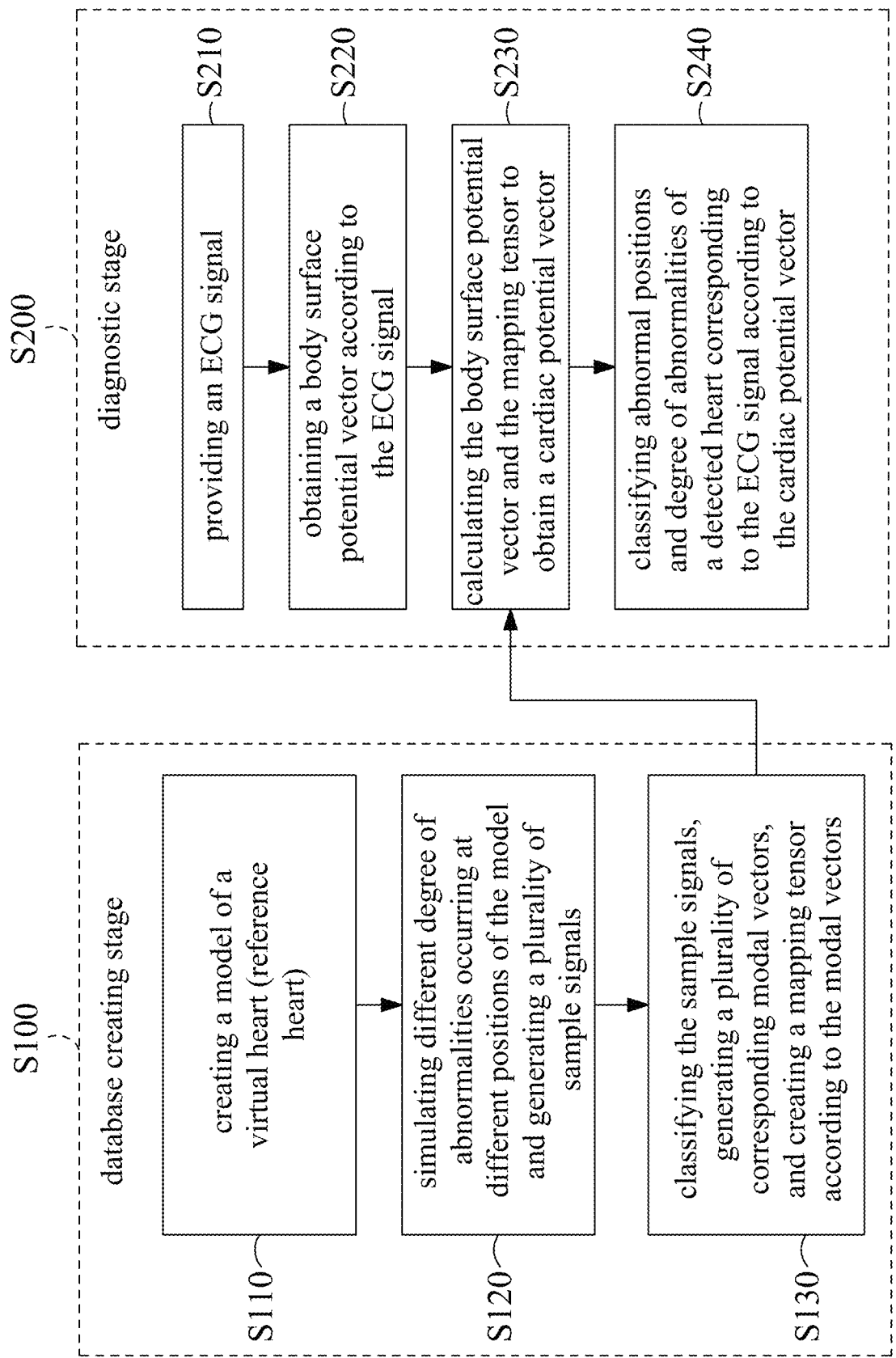
FIG. 1 is a schematic flow chart of steps of a cardiac diagnostic method of a first embodiment of the present disclosure.

The aforementioned and other technical contents, characteristics and effects of the present disclosure can be clearly presented by the detailed description of preferable embodiments together with the attached drawings. It is worth mentioning that the direction terms mentioned in the following embodiments, such as: top, bottom, left, right, front or rear are only referred to the direction of the drawings. Therefore, the directional terms used are intended to illustrate, not to limit, the disclosure. In addition, in the following embodiments, the same or similar components will use the same or similar reference numerals.

Referring to FIG. 1, FIG. 1 is a schematic flow chart of steps of a cardiac diagnostic method of a first embodiment of the present disclosure. The cardiac diagnostic method of the present embodiment includes a database creating stage S100 and a diagnostic stage S200, wherein the database creating stage S100 may be created in the diagnostic stage as a mapping tensor and database for operation basis, and includes the following steps: creating a model of a virtual heart (reference heart) (step S110); simulating different degree of abnormalities occurring at different positions of the model and generating a plurality of sample signals (step S120); classifying the sample signals, generating a plurality of corresponding modal vectors, and creating a mapping tensor according to the modal vectors (step S130). On the other hand, the diagnostic stage S200 may receive an electrocardiography (ECG) signal of a test subject, and then analyze and classify the ECG signal, and include the following steps: providing an ECG signal (step S210); obtaining a body surface potential vector according to the ECG signal (step S220); calculating the body surface potential vector and the mapping tensor to obtain a cardiac potential vector (Step S230); and classifying abnormal positions and degree of abnormalities of a detected heart corresponding to the ECG signal according to the cardiac potential vector (Step S240).

In detail, cardiac potential signals of a human body can be detected to obtain body surface signals by the electrical signal electrodes of non-invasive devices after being transmitted to the body surface. In other words, there is a specific mapping relationship between the cardiac potential signals and the body surface signals, and the ECG detection method is to confirm the heart status of the test subject by the body surface signals read by the instrument, which is interpreted by professional medical staff integrating previous professional knowledge and detecting experience. The cardiac diagnostic method of the present embodiment adopts a traditional electrophysiological theory, that is, first a virtual heart model is created, the virtual heart model is used to simulate a heart aspect to be detected, after the corresponding cardiac potential signals are generated, the generated cardiac potential signals are converted into the body surface signals through the mapping tensor, the model and the mapping tensor are adjusted and modified, so that the generated body surface signals are close to a real situation. Once the adjustment and modification of the virtual heart model is completed, there is no need to connect the instrument to the human body in real time at detecting in the future, but only need to obtain the body surface signals measured from the test subject, and it can be known whether the body surface signals of the test subject are consistent with the body surface signals generated when the virtual heart model occurs abnormality through the created model and the mapping tensor, so as to confirm whether the heart of the test subject occurs abnormality, the positions occurring abnormality and even the degree of abnormality.

Therefore, in the database creating stage S100, a three-dimensional model of the virtual heart is first created. The present embodiment obtains discrete tomographic images of a real heart in a specific direction through computed tomography, and procedures, such as filtering (e.g., median filtering), adjusting imaging parameters (e.g., Hounsfield unit) and smoothing, combined with a finite element method (FEM) are used to simulate the topological shape and internal structure of the real heart, namely the virtual heart model described above.

After that, the excitation time sequence of the cardiac potential is reconstructed according to the electrophysiological theory of the heart, because the real heart includes different nerve nodes, nerve fibers and muscle fibers, by simulating the conductance rate and conductance path of these tissues, a plurality of time series can be obtained, and then the actual path of each current through the Poisson's equation is calculated, and the different potential time sequences of each tissue are obtained, and the sample signal is further generated according to the electrophysiological theory of the actual heart.

Figure 2:
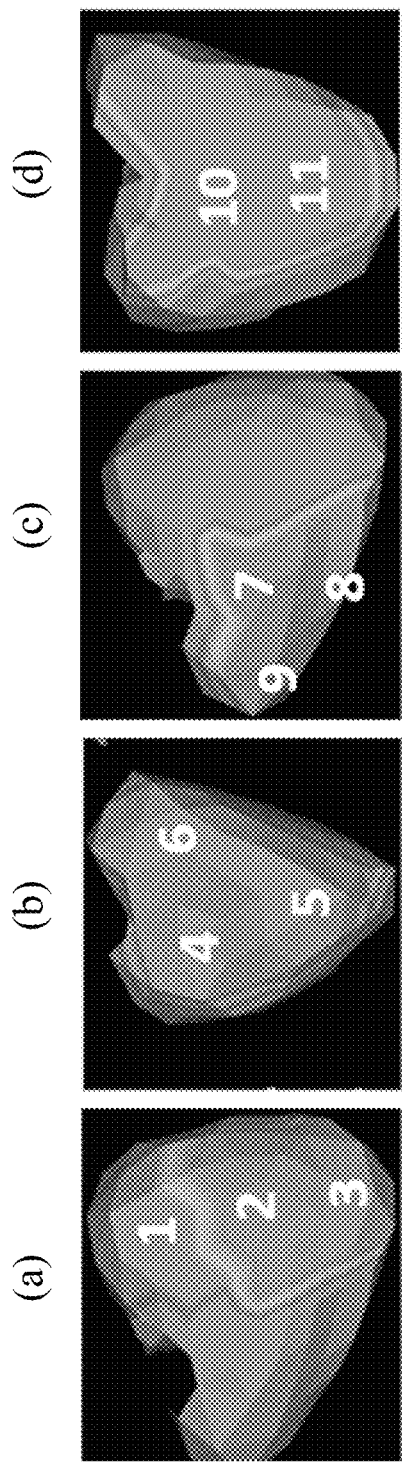
FIG. 2 shows a schematic view of (a) the left anterior descending artery; (b) the left circumflex artery; and (c) the anterior branch of the right coronary artery; and (d) the posterior branch of the right coronary artery in a virtual heart model.

Referring to FIG. 2, FIG. 2 shows a schematic view of (a) the left anterior descending artery; (b) the left circumflex artery; and (c) the anterior branch of the right coronary artery; and (d) the posterior branch of the right coronary artery in a virtual heart model. When myocardial infarction is an abnormal symptom of interest, because one of the causes of myocardial infarction is that the arteries that supply oxygen and blood to the myocardium harden or are embolized, the myocardium is short of blood and unable to contract normally. Therefore, in the present embodiment, the virtual heart model is initially classified into the left anterior descending (LAD) artery, the left circumflex (LCX) artery and the right coronary artery (RCA), and each category is subdivided into three, three and five regions, thereby simulating the potential status of ischemia in different regions. Through clinical experience and the upstream and downstream relationship of blood flow in the arteries, 26 ischemic region patterns (abnormal positions) can be defined as shown in Table 1.

TABLE 1

| Embolized artery | 1 | 2 | 3 | 4 | 5 | 6 | 7 | 8 | 9 | 10 | 11 | Ischemic region |
|---|---|---|---|---|---|---|---|---|---|---|---|---|
| Left anterior descending artery (regions 1-3) | X | | | | | | | | | | | 1 |
| | | X | | | | | | | | | | 2 |
| | | | X | | | | | | | | | 3 |
| | X | X | | | | | | | | | | 4 |
| | | X | X | | | | | | | | | 5 |
| | X | X | X | | | | | | | | | 6 |
| Left circumflex artery (regions 4-6) | | | | X | | | | | | | | 7 |
| | | | | | X | | | | | | | 8 |
| | | | | | | X | | | | | | 9 |
| | | | | X | X | | | | | | | 10 |
| | | | | | X | X | | | | | | 11 |
| | | | | X | | X | | | | | | 12 |
| | | | | X | X | X | | | | | | 13 |
| Right coronary artery (regions 7-11) | | | | | | | X | | | | | 14 |
| | | | | | | | | X | | | | 15 |
| | | | | | | | | | X | | | 16 |
| | | | | | | | | | | X | | 17 |
| | | | | | | | | | | | X | 18 |
| | | | | | | | X | X | | | | 19 |
| | | | | | | | X | | X | | | 20 |
| | | | | | | | | X | X | | | 21 |
| | | | | | | | | | | X | X | 22 |
| | | | | | | | | | X | X | | 23 |
| | | | | | | | | | X | X | X | 24 |
| | | | | | | | X | X | X | | | 25 |
| | | | | | | | X | X | X | X | X | 26 |

Specifically, the cardiac diagnostic method of the present embodiment mainly uses a 12-lead ECG signal as an input parameter for detection, but the present disclosure is not limited thereto. According to the actual hardware specifications or more accurate requirements for the detection results, the electrocardiogram signal used in the cardiac diagnostic method may also use a lower number of leads (e.g., a single lead to 11 leads) ECG signal, which can effectively reduce the required time and cost; or more leads (e.g., 24, 48 or 64 leads or more) ECG signal is used and calculations on a high-performance computer are performed to obtain more accurate results. In addition, the symptoms detected are not limited to myocardial infarction, but may also include heart failure, ventricular hypertrophy and other conditions. Further considering the actual situation of the boundary vascular distribution of adjacent regions, the above 26 ischemic region patterns may be further amplified or reduced, coupled with the possibility of random pairing to increase the combination of regions, resulting in 1638 non-repeating 12-lead potential distribution situations, and then these 1638 non-repeating potential distribution situations can be combined with the severity (abnormality) of 5 ischemia, and 8190 pieces of 12-lead ECG signal database can be further combined, namely the sample signal shown in step S120 in FIG. 1.

It is worth mentioning that the severity of the above 5 ischemia is determined by transcellular potentials, in the present embodiment, reducing the resting potential amplitude (e.g., reduced to 93%, 90%, 85%, 80% and 50% of the normal potential amplitude, respectively) and delaying the excitation potential time are as indicator values of severity 1-5, but the present disclosure is not limited thereto, according to the actual needs of the inspector or detection symptoms, the user may also define different severity classifications by different indicator values, as a basis for creating a database.

Since the body surface ECG signal is a quasi-periodic signal, the ischemic body surface ECG signal generated by simulation can be normalized and arranged by machine learning (such as ANN neural networks) or artificial methods, so that the 8190 pieces of ECG signals of the plurality of abnormal positions and the plurality of degree of abnormalities respectively corresponding to the virtual heart model (reference heart) form a tensor. Since the combination of each abnormal position and each degree of abnormality corresponds to a modality of the virtual heart, the vector corresponding to these ECG signals is defined as the modal vector v. Accordingly, the modal vector v can be arranged into the mapping tensor A described above according to the corresponding artery, namely:

$$\underbrace{\underbrace{v_{A,1} \; v_{A,2} \; \cdots \; v_{A,n_A}}_{A_{Anterior}} \; \underbrace{v_{L,1} \; v_{L,2} \; \cdots \; v_{L,n_L}}_{A_{Lateral}} \; \underbrace{v_{I,1} \; v_{I,2} \; v_{I,n_I}}_{A_{Inferior}}}_{A}$$

Among them, $A_{Anterior}$, $A_{Lateral}$, and $A_{Inferior}$ respectively represent sub-mapping tensors of the anterior artery, lateral artery and inferior artery in the mapping tensor A, and $v_A$, $v_L$, and $v_I$ respectively represent the weight vectors in each the sub-mapping tensor. Therefore, if the body surface potential is expressed in the form of a vector, that is, a body surface potential vector y and a cardiac potential vector x of the body surface potential vector y corresponding to the virtual heart model are defined, then the mapping tensor A, the cardiac potential vector x, and the body surface potential vector y should satisfy the following equation representation, namely:

$$Ax=y$$

Since the mapping tensor A and the body surface potential vector y are known, only the cardiac potential vector x needs to be solved, and the modality of a detected heart corresponding to the plurality of leads ECG signal can be obtained according to a plurality of leads ECG signal provided, and the abnormal positions and the degree of abnormalities of the detected heart are classified, or the above classification results are provided to medical personnel as a reference for judging myocardial infarction.

Figure 3:
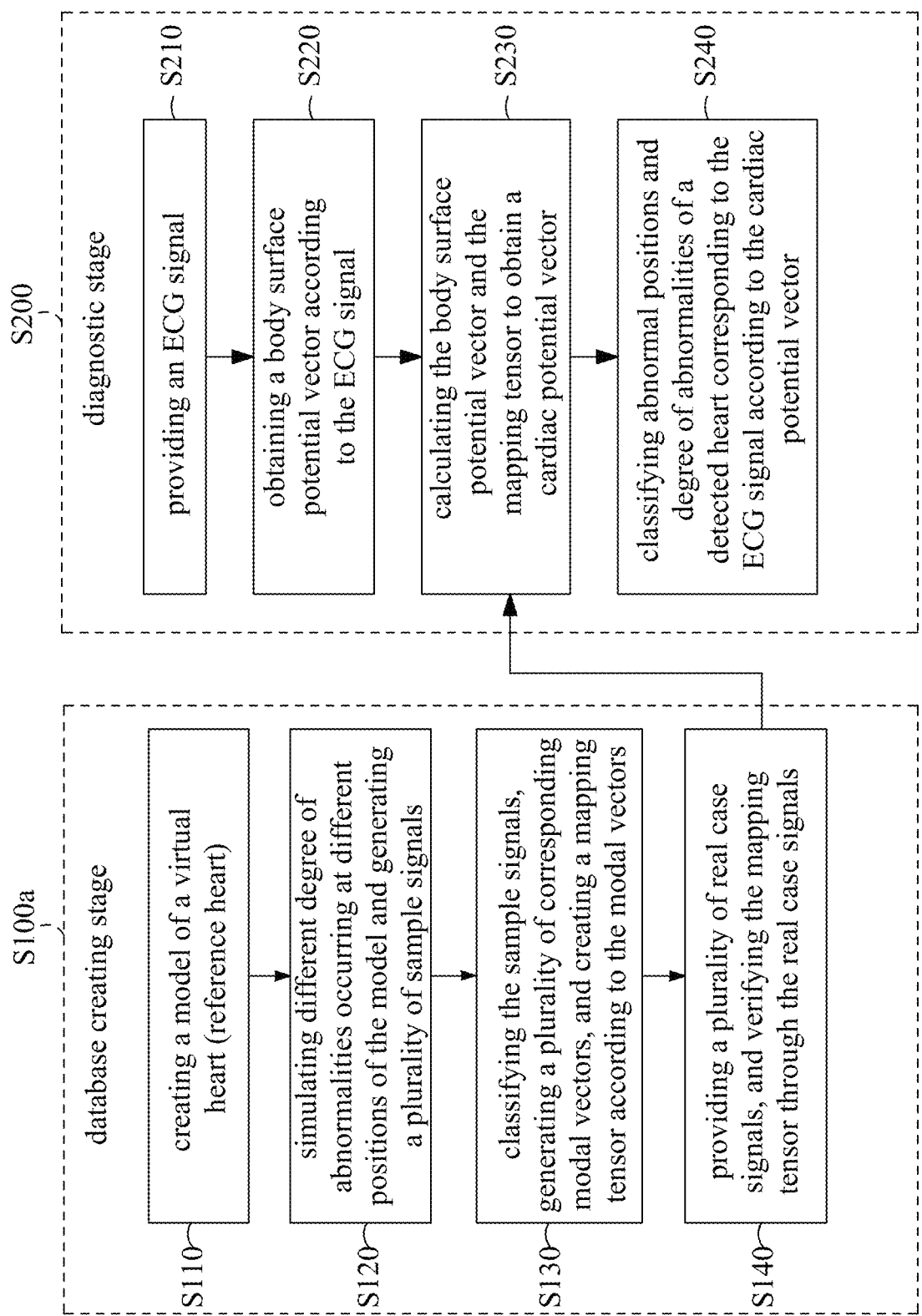
FIG. 3 is a schematic flow chart of steps of a cardiac diagnostic method of a second embodiment of the present disclosure.

Referring to FIG. 1 and FIG. 3 together, FIG. 3 is a schematic flow chart of the steps of the cardiac diagnostic method of a second embodiment of the present disclosure. The cardiac diagnostic method of the present embodiment is roughly similar to the cardiac diagnostic method of the first embodiment, the main difference is in that: a database creating stage S100a of the cardiac diagnostic method of the present embodiment further includes providing a plurality of real case signals, and verifying the mapping tensor through the real case signals (step S140).

In detail, in the creating stage of mapping tensor A and database, the ECG signals corresponding to the real myocardial infarction cases can be obtained from clinical cases, and the corresponding cardiac potential signals can be obtained by solving these ECG signals through the mapping tensor A, and whether the cardiac modality corresponding to the obtained cardiac potential signal is consistent with the abnormal positions and the degree of abnormalities on the virtual heart model is confirmed, so as to verify the mapping tensor A and further improve the reliability of the calculation model. In the present embodiment, the number of real case signals used to verify with the mapping tensor A is 148, but according to the actual demand and the number of cases obtained, the real case signals for verification can be increased or decreased, and the present disclosure is not limited in this regard.

Figure 4:
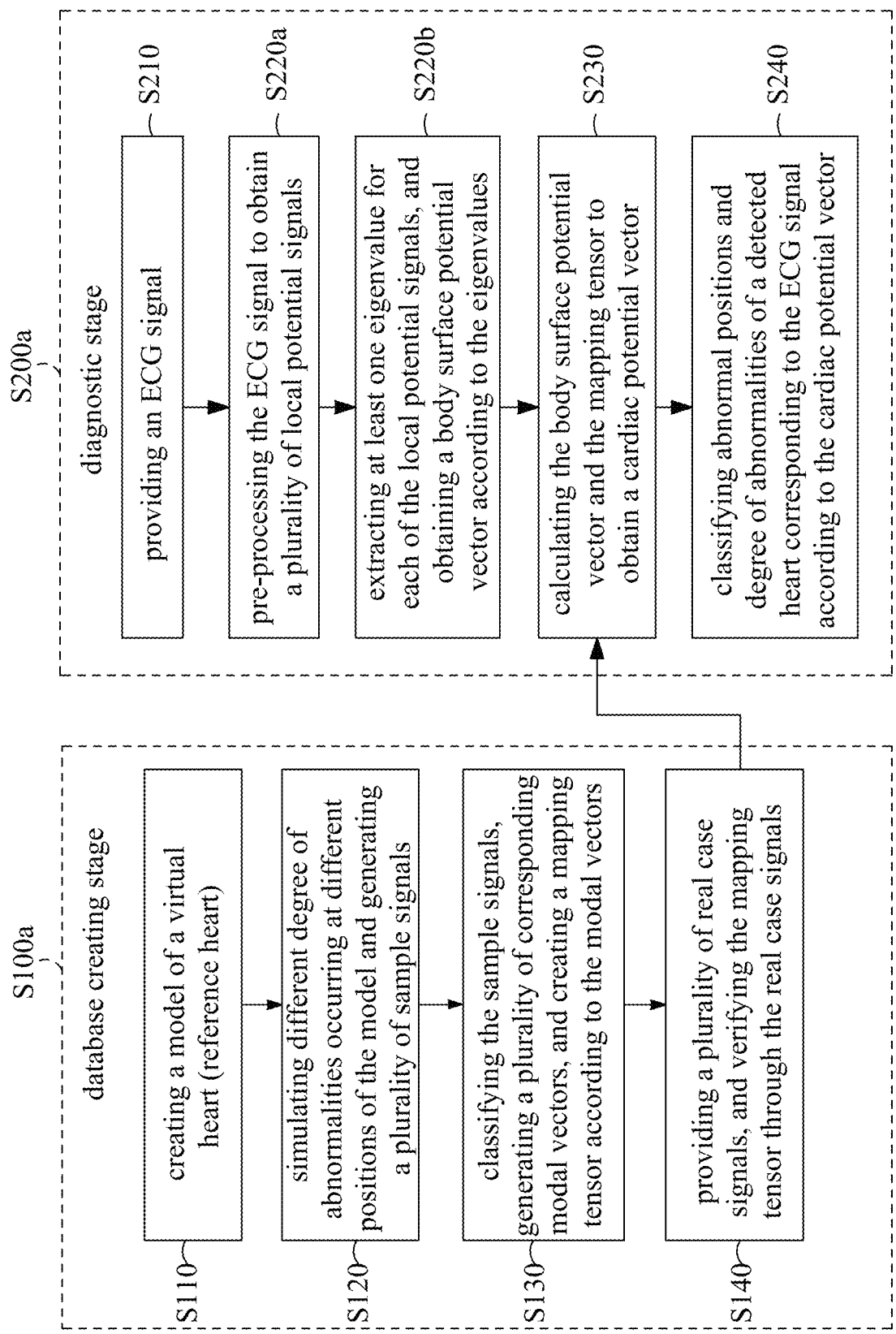
FIG. 4 is a schematic flow chart of steps of a cardiac diagnostic method of a third embodiment of the present disclosure.

Referring to FIG. 3 and FIG. 4 together, FIG. 4 is a schematic flow chart of the steps of the cardiac diagnostic method of a third embodiment of the present disclosure. The cardiac diagnostic method of the present embodiment is roughly similar to the cardiac diagnostic method of the second embodiment, the main difference is in that: the diagnostic stage S200a of the cardiac diagnostic method of the present embodiment further includes pre-processing the ECG signal to obtain a plurality of local potential signals (step S220a); and extracting at least one eigenvalue for each of these local potential signals, and obtaining a body surface potential vector according to these eigenvalues (Step S220b).

Figure 5:
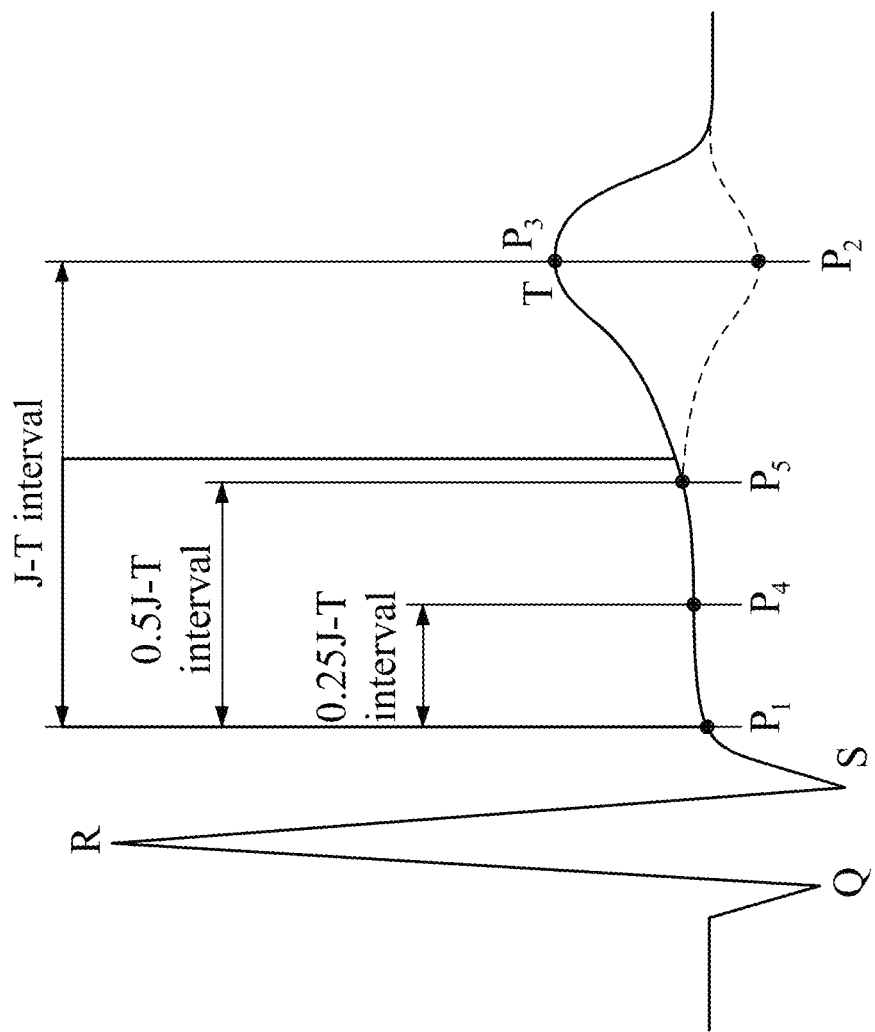
FIG. 5 is a schematic view of extracting the eigenvalues in step S220b of FIG. 4.

Referring to FIG. 4 and FIG. 5 together, FIG. 5 is a schematic view of extracting the eigenvalues in step S220b of FIG. 4. The raw ECG signal measured from the test subject may contain noise, and the eigenvalues required for the calculation are less obvious. For this purpose, the raw ECG signal can be pre-processed to improve the accuracy of the subsequent calculation results.

In detail, the ECG signals used in the present embodiment are, for example, 12-lead body surface ECG signals, these ECG signals may be measured directly from the test subject in real time, or stored in a computer or hospital database after pre-measuring and received by transmission, the present disclosure is not limited in this regard. When the raw ECG signal of the test subject has noise, a bandwidth filter such as 0.05-40 Hz can be used to filter out cardiac signals of arrhythmias and misalignment, and the median filter can be further used to discretize the raw signal to obtain a cleaner signal. Then, by detecting the performance of QRS wave in the signal with an instrument, the quasi-periodic characteristics of the signal are more obvious. In addition, the Pan Tompkin algorithm can be used to determine the time interval of adjacent periods, so as to extract a single periodic signal in the quasi-periodic signal. Finally, the oscillations in the periodic signal can be averaged and smoothed to obtain a clearer local signal corresponding to the raw ECG signal.

After completing the signal pre-processing step, the required eigenvalues for calculation can be further extracted from these local signals. Specifically, since a S-T segment in the ECG signal has a strong correlation with the performance of myocardial infarction, the present embodiment extracts the local potential signals from the ECG signal, and extracts 5 eigenvalues of each of the S-T segments of these local signals, such as but not limited to the potential amplitude value of J point $P_1$, the minimum amplitude value of T wave at the lowest point $P_2$, the maximum amplitude value of T wave at the highest point $P_3$, the potential amplitude value of the first potential point $P_4$ and the potential amplitude value of the second potential point $P_5$, wherein the first potential point $P_4$ is a potential point that is 0.25 times as long as a J-T interval from J point $P_1$ on the S-T segment of this local signal, and the second potential point $P_5$ is a potential point that is 0.5 times as long as the J-T interval from J point $P_1$ on the S-T segment of this local signal. Because each lead has these 5 eigenvalues, 60 eigenvalues can be obtained from the above 12-lead ECG signal and arranged sequentially in the form of a vector, resulting in a 60×1 body surface potential vector y.

Thus, in the cardiac diagnostic method of the third embodiment, the conditions of the equation may be further established as:

$$Ax=y$$

$$A\in R^{60\times 8190}, x\in R^{8190\times 1}, y\in R^{60\times 1}$$

Figure 6:
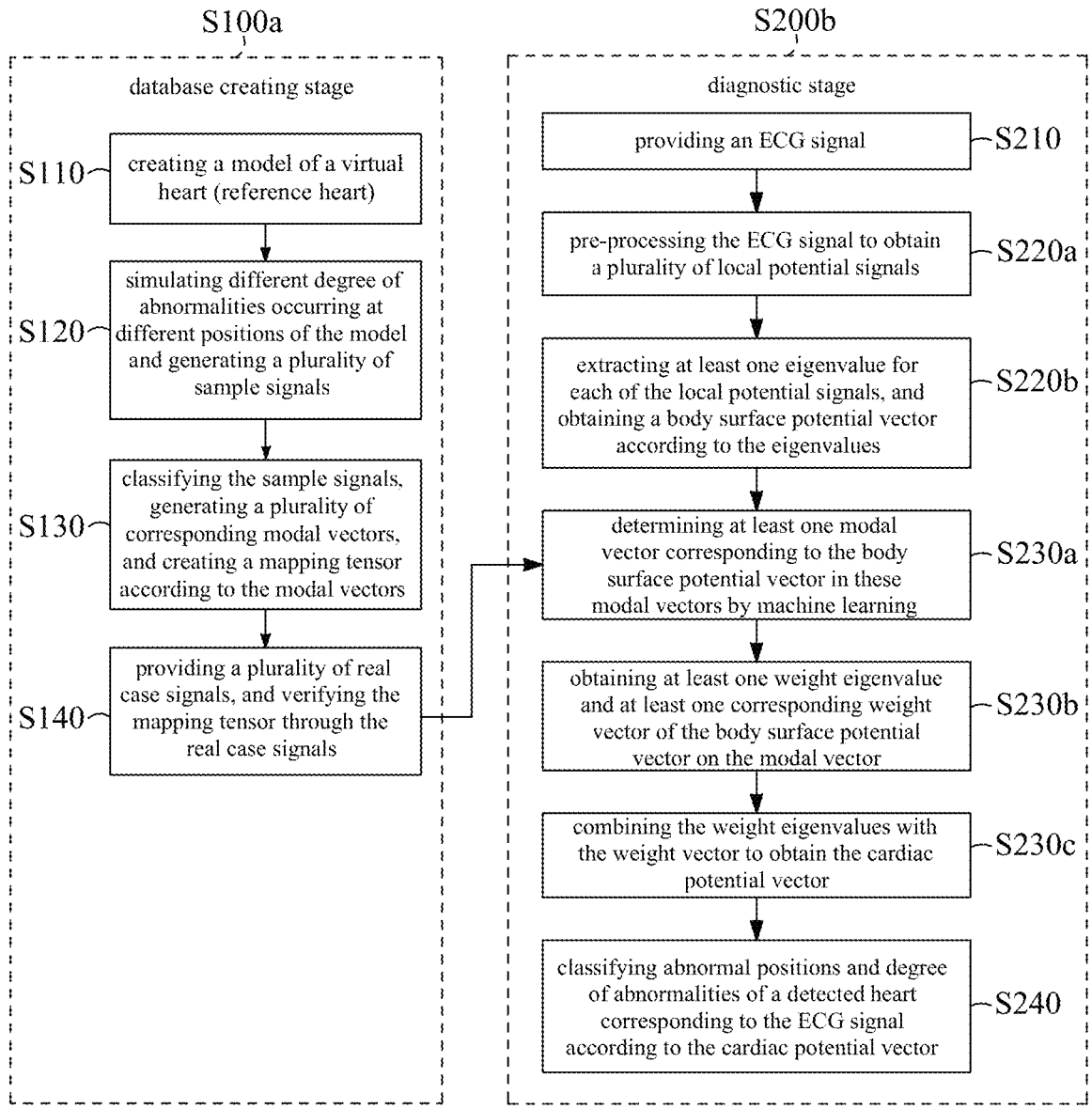
FIG. 6 is a schematic flow chart of the steps of the cardiac diagnostic method of a fourth embodiment of the present disclosure.

Referring to FIG. 4 and FIG. 6 together, FIG. 6 is a schematic flow chart of the steps of the cardiac diagnostic method of a fourth embodiment of the present disclosure. The cardiac diagnostic method of the present embodiment is roughly similar to the cardiac diagnostic method of the third embodiment, the main difference is in that: the diagnostic stage S200b of the cardiac diagnostic method of the present embodiment further includes determining at least one modal vector corresponding to the body surface potential vector in these modal vectors by machine learning (step S230a); obtaining at least one weight eigenvalue and at least one corresponding weight vector of the body surface potential vector on the modal vector (step S230b); and combining the weight eigenvalues with the weight vector to obtain the cardiac potential vector (step S230c).

In detail, in the cardiac diagnostic method of the third embodiment, it can be found that there are only 60 eigenvalues as the basis for detection, but even the combination of ischemia positions and ischemia degree that has not been amplified or reduced by nodes has 26×5=130 kinds, so if this indeterminate equation is solved directly, it may not be possible to obtain a unique solution, or it is necessary to set a large number of boundary conditions to be solved, and the solution requires a lot of computing resources and time. However, according to the traditional electrophysiological simulation process, it can be known that there is no obvious interaction between a specific arterial embolism and other arteries, so if it is assumed that the body surface potential vector $y\in R^{60\times n_i}$ can be classified as a modality of class i, wherein $i\in[1,130]$, and as the various modal vectors v are arranged in the order of the anterior artery, lateral artery and inferior artery, the following equations can be further obtained:

$$A=[A_1,A_2,\ldots,A_k]=[v_{1,1},v_{1,2},\ldots,v_{k,n_k}]$$

$$y\cong \omega_{i,1}v_{i,1}+\omega_{i,2}v_{i,2}+\ldots +\omega_{i,n_i}v_{i,n_i}$$

Among them, $\omega_i$ and $v_i$ are respectively at least one weight eigenvalue and at least one corresponding weight vector that correspond to at least one modal vector v of the body surface potential vector y in the modal vector v, and the corresponding weight vectors can be determined by machine learning, such as sparse representation classification, and thus the 8190 modal vectors v that may correspond to the body surface potential vector y are reduced to a smaller number of weight vectors $v_i$, reducing the unknown conditions at the time of solving. In addition, the cardiac potential vector $x_0$ is defined as:

$$x_0 = [0, \ldots, \omega_{i,1}, \omega_{i,2}, \ldots, \omega_{i,n_i}, 0, \ldots, 0]^T \in R^n$$

The mapping tensor A, the cardiac potential vector $x_0$, and the body surface potential vector y can be expressed by the following formula:

$$y = A x_0 \in R^{60}$$

Because the dimension 60 of the range is much smaller than the column space dimension 8190 of the mapping tensor A, and most of the elements in the mapping tensor A are 0, $x_0$ is sparse enough to conform to the Lagrangian Form of the Lasso algorithm, so the loss function L can be further defined by coordinate descent, that is:

$$x = [x_1, x_2, \cdots, x_{8190}]^T$$

$$L = \sum_{i=1}^{60} \left[ \sum_{j=1}^{8190} (A_{i,j} x_j) - y_i \right]^2 + \lambda \sum_{j=1}^{8190} |x_j|$$

In order to find the minimum value of the loss function L, the loss function L can be partial differential to any element $x_L$ in the cardiac potential vector $x_0$, and the solved element $x_L = x_i$ is the weight eigenvalue $\omega_i$ of the corresponding category, so the body surface potential vector y can be classified into a linear combination of a specific weight eigenvalue $\omega_i$ and a weight vector $v_i$. Also, because each morality corresponds to different ischemia position distribution and different ischemia degree, users can classify the ischemic position and ischemia degree of the detected heart with high accuracy in an approximate analytical solution with less computing resources, which greatly improves the efficiency of the cardiac diagnostic method.

Figure 7:
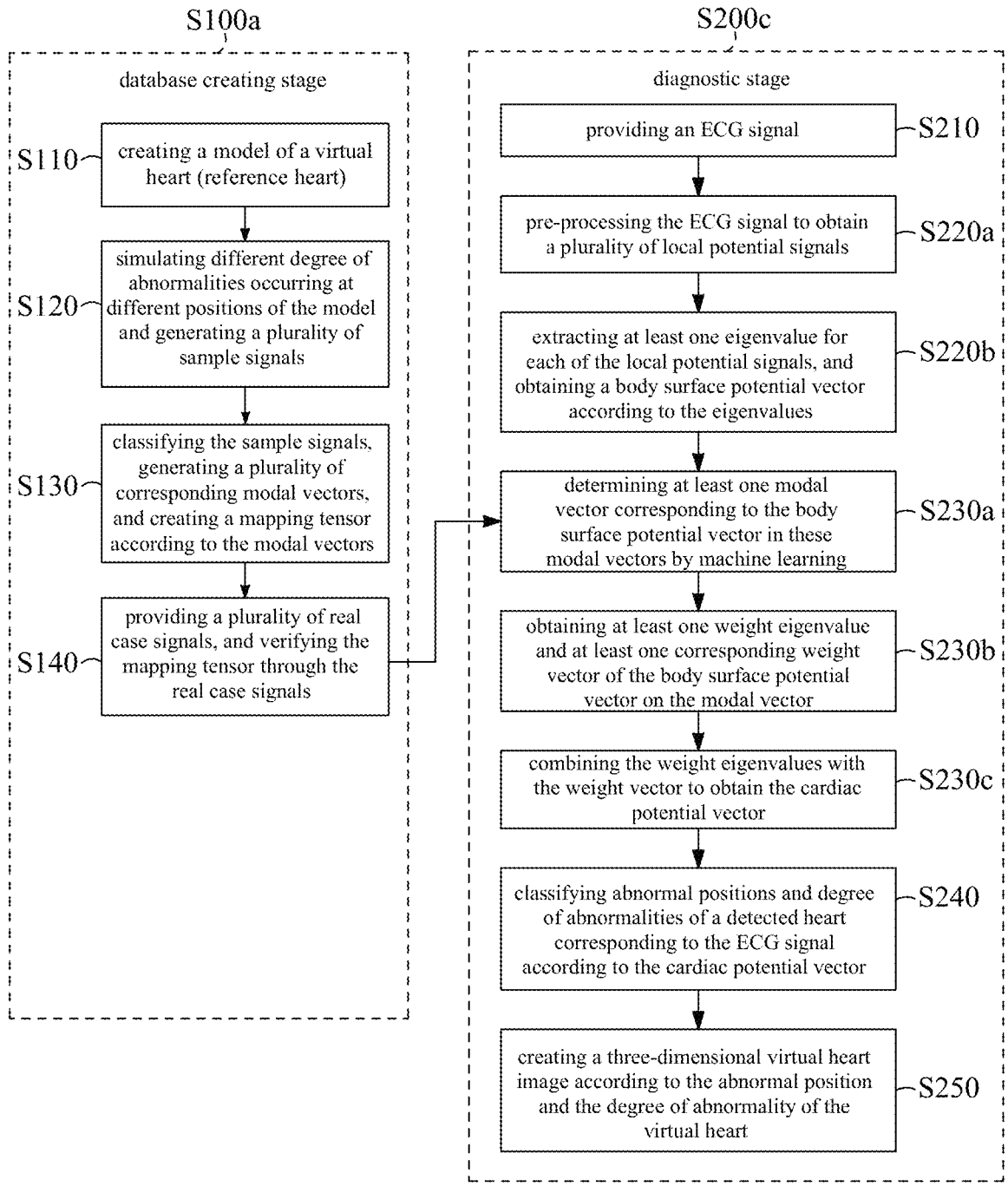
FIG. 7 is a schematic flow chart of the steps of the cardiac diagnostic method of a fifth embodiment of the present disclosure.

Referring to FIG. 6 and FIG. 7 together, FIG. 7 is a schematic flow chart of the steps of the cardiac diagnostic method of a fifth embodiment of the present disclosure. The cardiac diagnostic method of the present embodiment is roughly similar to the cardiac diagnostic method of the fourth embodiment, the main difference is in that: the diagnostic stage S200c of the cardiac diagnostic method of the present embodiment further includes creating a three-dimensional virtual heart image according to the abnormal position and the degree of abnormality of the virtual heart (step S250).

Figure 8:
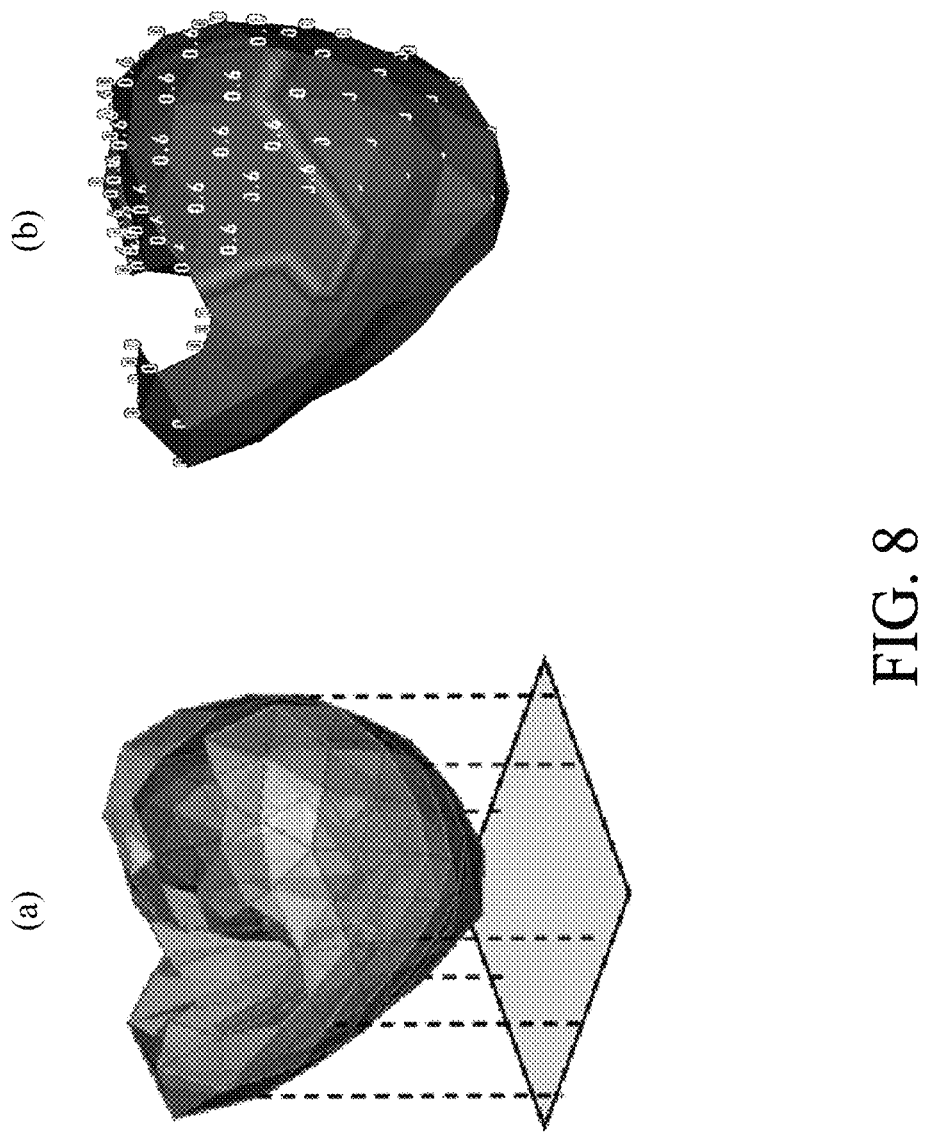
FIG. 8 is (a) a topology graph of the three-dimensional virtual heart image created in step S250 of FIG. 7; and (b) a coloring topology graph.

Referring to FIG. 7 and FIG. 8 together, FIG. 8 is (a) a topology graph of the three-dimensional virtual heart image created in step S250 of FIG. 7; and (b) a coloring topology graph. When the user obtains the category of the detected heart corresponding to the modal vector v through the cardiac potential vector x, the ischemic position and ischemia degree of the detected heart can be known, at this time, the modal vector. v corresponding to the cardiac potential vector x in the mapping tensor A can be combined with the virtual heart model to project into the three-dimensional coordinate space to form a topology graph created by finite elements, or further assign different heart regions in the topology graph to different colors according to the degree of ischemia, it can provide visual information similar to cardiac nuclear medical examination and imaging for medical personnel, which is more conducive to the interpretation of medical personnel.

Figure 9:
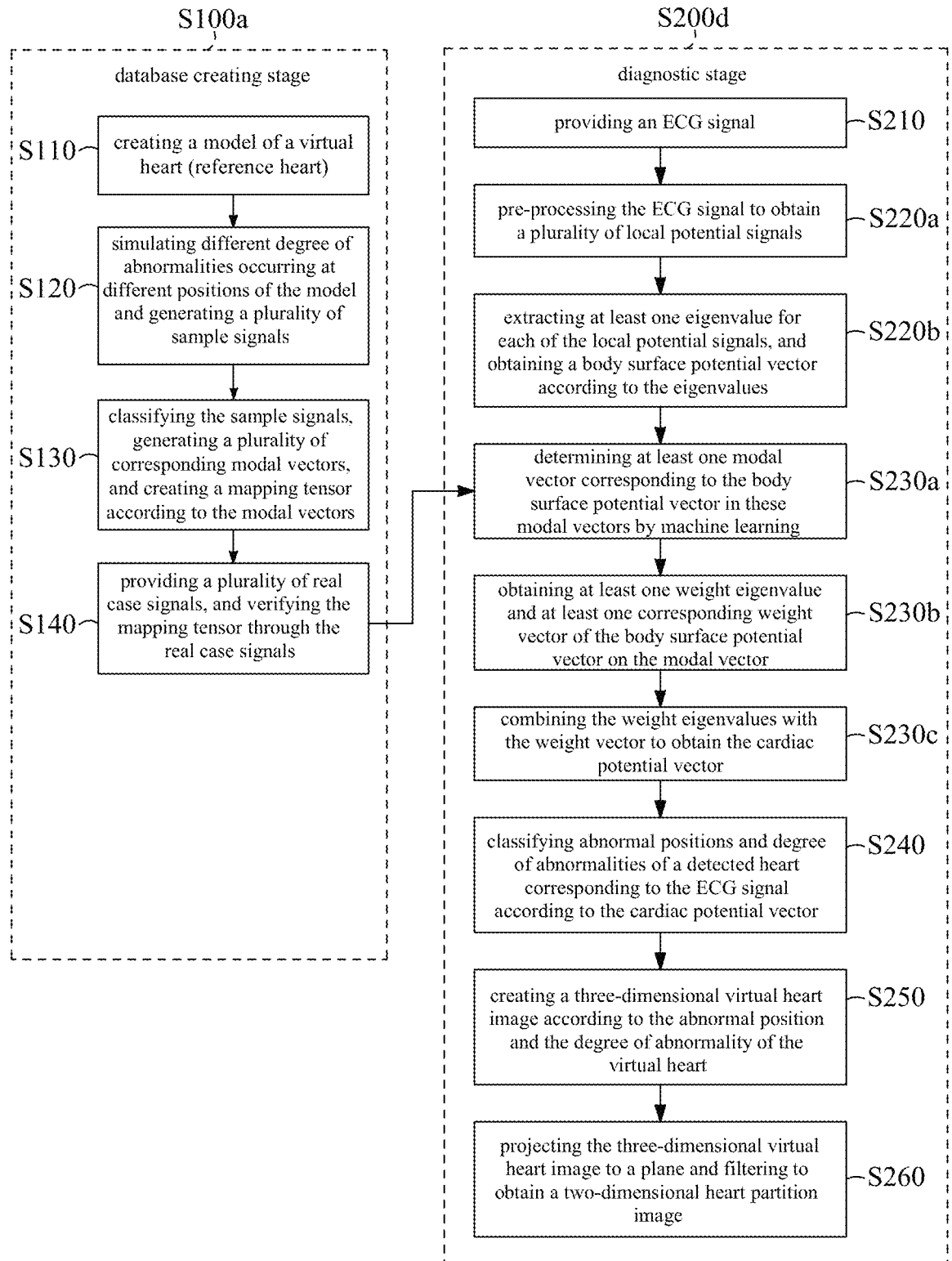
FIG. 9 is a schematic flow chart of the steps of the cardiac diagnostic method of a sixth embodiment of the present disclosure.

Referring to FIG. 7 and FIG. 9 together, FIG. 9 is a schematic flow chart of the steps of the cardiac diagnostic method of a sixth embodiment of the present disclosure. The cardiac diagnostic method of the present embodiment is roughly similar to the cardiac diagnostic method of the fifth embodiment, the main difference is in that: the diagnostic stage S200d of the cardiac diagnostic method of the present embodiment further includes projecting the three-dimensional virtual heart image to a plane and filtering to obtain a two-dimensional heart partition image (step S260).

Figure 10:
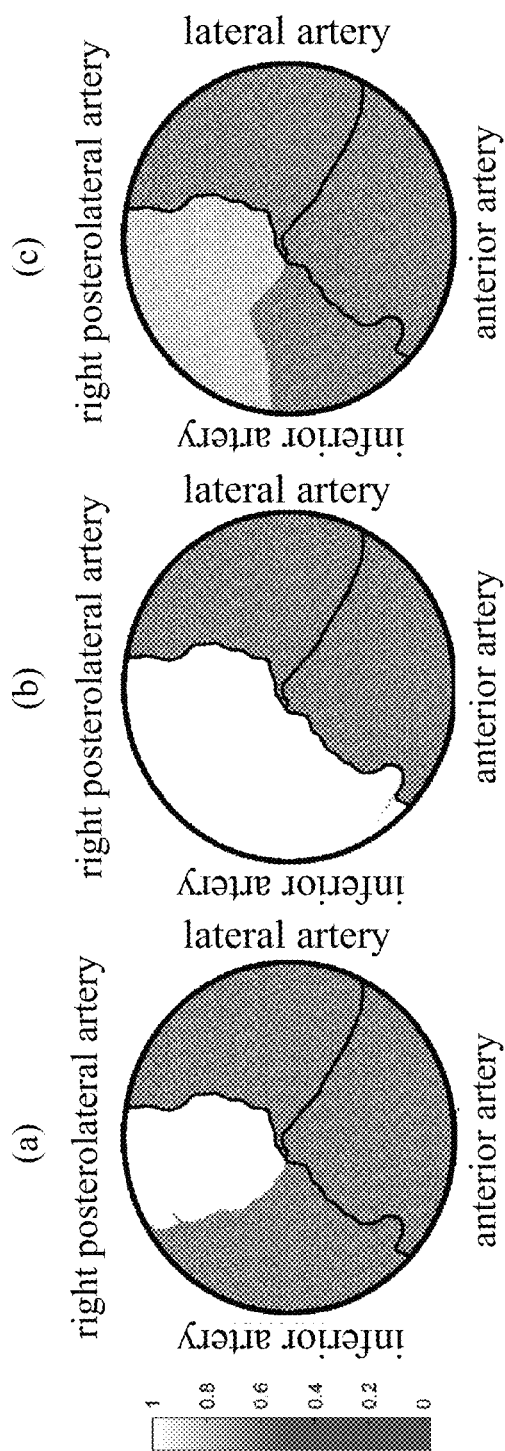
FIG. 10 is a schematic view of the two-dimensional heart partition images of (a) a first test subject; (b) a second test subject; and (c) a third subject obtained in step S260 of FIG. 9.

Referring to FIG. 9 and FIG. 10 together, FIG. 10 is a schematic view of the two-dimensional heart partition images of (a) a first test subject; (b) a second test subject; and (c) a third subject obtained in step S260 of FIG. 9. Although the three-dimensional virtual heart image can fully show the ischemic region and the degree of ischemia of the detected heart, medical personnel need to look around the entire virtual heart model to confirm the complete condition of the detected heart, and cannot quickly and intuitively present the medical diagnosis information. Therefore, the three-dimensional virtual heart image can be further projected as a two-dimensional image, taking the circular chart as an example, the coordinates $(x_n, y_n, z_n)$ of the three-dimensional virtual heart image can be determined by the following formulas to correspond to new coordinates $(x_n', y_n')$ in the two-dimensional heart image:

$$D = \sqrt{x_n^2 + y_n^2}$$

$$r = z_n / D$$

$$x_n' = x_n \times r$$

$$y_n' = y_n \times r \quad n \in [1, 2, \ldots, 257]$$

After obtaining the new coordinates $(x_n', y_n')$, a rotation angle between the new coordinates $(x_n', y_n')$ and the original coordinates $(x_n, y_n)$ can be determined through a rotation matrix, namely:

$$\begin{bmatrix} x' \\ y' \\ z' \end{bmatrix} = \begin{bmatrix} \cos\theta & 0 & \sin\theta \\ 0 & 1 & 0 \\ -\sin\theta & 0 & \cos\theta \end{bmatrix} \begin{bmatrix} x \\ y \\ z \end{bmatrix}$$

After the projection is completed, it can be processed by graphic masking, filtering (such as the median filter) and adjusting the color to form two-dimensional heart partition images as shown in FIG. 10(a), FIG. 10(b) and FIG. (c), in which different blocks of each circular figure respectively represent the right posterolateral artery, lateral artery, anterior artery and inferior artery region of the virtual heart model in a clockwise direction from the top of the figure, dark color represents sufficient blood flow, and lighter color represents more severe ischemia. Accordingly, medical personnel can quickly confirm the ischemia position and degree of ischemia in the heart, and further enhance the effectiveness of the cardiac diagnosis method.

It is worth mentioning that although a three-dimensional virtual heart image is first created in the present embodiment, and then the three-dimensional virtual heart image is projected to a plane to form a two-dimensional heart partition image, but the present disclosure is not limited thereto. When users do not have the need to refer to the three-dimensional virtual heart image, they can also directly map the abnormal position and degree of abnormality corresponding to the cardiac potential vector $x_0$ to the plane to form an image, thereby saving time and resources for constructing a three-dimensional model.

In fact, the cardiac diagnostic method provided by the present disclosure may be implemented by a system or a non-transitory computer-readable recording medium storing the above computer program, wherein the system includes a processor and a memory, the memory is coupled to the processor and for storing a plurality of instructions, these instructions may be executed by the processor so that the processor performs the following operations: providing an electrocardiogram signal; obtaining a body surface potential vector according to the ECG signal; calculating the body surface potential vector and a pre-created mapping tensor to obtain a cardiac potential vector, wherein the mapping tensor is obtained according to a plurality of abnormal positions and a plurality of degree of abnormalities generated by a reference heart; and classifying the abnormal positions and the degree of abnormalities of a detected heart corresponding to the ECG signal according to the cardiac potential vector.

Specifically, the system may further include a receiving unit, a detection unit, a database and an output unit, wherein the receiving unit is used to receive the measured or pre-stored ECG signal; the detection unit can obtain the cardiac potential vector x by calculating the ECG signal received by the receiving unit and the mapping tensor A created according to the modal vector v in the database through the above cardiac diagnosis method, after the abnormal positions and the degree of abnormalities of the detected heart are classified, the classification result is output through the output unit, or the three-dimensional virtual heart image and the two-dimensional heart partition image as shown in FIG. 8 and FIG. 10 are further displayed. Since the above process is realized through program automation, the labor and cost required for general detection are greatly reduced, so it can be applied to early prediction and treatment course tracking.

On the other hand, the non-transitory computer-readable recording medium includes but not limited to a register, processor cache, random access memory (RAM), read-only memory (ROM), optical disc or magnetic disk, read-only memory disc (CD-ROM), USB disk or hard disk, and a computing device may be a notebook computer, personal computer, industrial computer, business computer, workstation, server, computer cluster, portable electronic device, etc.

While the present invention has been described by means of preferable embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A cardiac diagnostic method, comprising the following steps:
   providing an electrocardiogram (ECG) signal;
   obtaining a body surface potential vector according to the ECG signal;
   calculating the body surface potential vector and a pre-created mapping tensor to obtain a cardiac potential vector, wherein the mapping tensor is obtained according to a plurality of abnormal positions and a plurality of degree of abnormalities generated by a reference heart; and
   classifying the abnormal positions and the degree of abnormalities of a detected heart corresponding to the ECG signal according to the cardiac potential vector.

2. The cardiac diagnostic method according to claim 1, wherein the reference heart is a virtual heart, and the cardiac diagnostic method further comprises the following steps:
   creating a model of the virtual heart;
   simulating different degree of abnormalities occurring at different positions of the model and generating a plurality of sample signals; and
   classifying the plurality of sample signals, generating a plurality of corresponding modal vectors, and creating the mapping tensor according to the plurality of modal vectors.

3. The cardiac diagnostic method according to claim 2, further comprising the following steps:
   determining at least one modal vector corresponding to the body surface potential vector in the plurality of modal vectors by machine learning;
   obtaining at least one weight eigenvalue and at least one corresponding weight vector of the body surface potential vector on the at least one modal vector; and
   combining the at least one weight eigenvalue with the at least one weight vector to obtain the cardiac potential vector.

4. The cardiac diagnostic method according to claim 3, wherein the machine learning determines the at least one modal vector by sparse representation classification, and the cardiac diagnostic method obtains the at least one weight eigenvalue and the at least one weight vector by coordinate descent.

5. The cardiac diagnostic method according to claim 1, further comprising the following steps:
   pre-processing the electrocardiogram signal to obtain a plurality of local potential signals, wherein the number of the plurality of local potential signals is the same as the number of leads of the ECG signal; and
   extracting at least one eigenvalue for each of the plurality of local potential signals, and obtaining the body surface potential vector according to the plurality of at least one eigenvalues.

6. The cardiac diagnostic method according to claim 5, wherein the at least one eigenvalue comprises an amplitude value of J point, a minimum amplitude value of T wave, a maximum amplitude value of T wave, an amplitude value of a first potential point and an amplitude value of a second potential point of a corresponding local signal in the plurality of local signals, wherein the first potential point is a potential point that is 0.25 times as long as a J-T interval from J point on a S-T segment of the local signal, and the second potential point is a potential point that is 0.5 times as long as the J-T interval from J point on the S-T segment of the local signal.

7. The cardiac diagnostic method according to claim 1, wherein the reference heart is a virtual heart, and the cardiac diagnostic method further comprises the following step:
   creating a three-dimensional virtual heart image according to the abnormal position and the degree of abnormality of the virtual heart.

8. The cardiac diagnostic method according to claim 7, further comprising the following step:
   projecting the three-dimensional virtual heart image to a plane and filtering to obtain a two-dimensional heart partition image.

9. A non-transitory computer-readable medium for storing instructions, when a computing device executes the non-transitory computer-readable medium, the computing device can perform a plurality of operations comprising:
provide an electrocardiogram (ECG) signal;
obtaining a body surface potential vector according to the ECG signal;
calculating the body surface potential vector and a pre-created mapping tensor to obtain a cardiac potential vector, wherein the mapping tensor is obtained according to a plurality of abnormal positions and a plurality of degree of abnormalities generated by a reference heart; and
classifying the abnormal positions and the degree of abnormalities of a detected heart corresponding to the ECG signal according to the cardiac potential vector.

10. The non-transitory computer-readable medium according to claim 9, wherein the reference heart is a virtual heart, and the plurality of operations further comprise:
creating a model of the virtual heart;
simulating different degree of abnormalities occurring at different positions of the model and generating a plurality of sample signals; and
classifying the plurality of sample signals, generating a plurality of corresponding modal vectors, and creating the mapping tensor according to the plurality of modal vectors.

11. The non-transitory computer-readable medium according to claim 10, wherein the plurality of operations further comprise:
determining at least one modal vector corresponding to the body surface potential vector in the plurality of modal vectors by machine learning;
obtaining at least one weight eigenvalue and at least one corresponding weight vector of the body surface potential vector on the at least one modal vector; and
combining the at least one weight eigenvalue with the at least one weight vector to obtain the cardiac potential vector.

12. The non-transitory computer-readable medium according to claim 11, wherein the machine learning determines the at least one modal vector by sparse representation classification, and the cardiac diagnostic method obtains the at least one weight eigenvalue and the at least one weight vector by coordinate descent.

13. The non-transitory computer-readable medium according to claim 9, wherein the plurality of operations further comprise:
pre-processing the electrocardiogram signal to obtain a plurality of local potential signals, wherein the number of the plurality of local potential signals is the same as the number of leads of the ECG signal; and
extracting at least one eigenvalue for each of the plurality of local potential signals, and obtaining the body surface potential vector according to the plurality of at least one eigenvalues.

14. The non-transitory computer-readable medium according to claim 9, wherein the reference heart is a virtual heart, and the plurality of operations further comprise:
creating a three-dimensional virtual heart image according to the abnormal position and the degree of abnormality of the virtual heart.

15. A system, comprising:
a processor; and
a memory, coupled to the processor and for storing a plurality of instructions, the plurality of instructions can be executed by the processor so that the processor performs a plurality of operations comprising:
providing an electrocardiogram (ECG) signal;
obtaining a body surface potential vector according to the ECG signal;
calculating the body surface potential vector and a pre-created mapping tensor to obtain a cardiac potential vector, wherein the mapping tensor is obtained according to a plurality of abnormal positions and a plurality of degree of abnormalities generated by a reference heart; and
classifying the abnormal positions and the degree of abnormalities of a detected heart corresponding to the ECG signal according to the cardiac potential vector.

16. The system according to claim 15, wherein the reference heart is a virtual heart, and the plurality of operations further comprise:
creating a model of the virtual heart;
simulating different degree of abnormalities occurring at different positions of the model and generating a plurality of sample signals; and
classifying the plurality of sample signals, generating a plurality of corresponding modal vectors, and creating the mapping tensor according to the plurality of modal vectors.

17. The system according to claim 16, wherein the plurality of operations further comprise:
determining at least one modal vector corresponding to the body surface potential vector in the plurality of modal vectors by machine learning;
obtaining at least one weight eigenvalue and at least one corresponding weight vector of the body surface potential vector on the at least one modal vector; and
combining the at least one weight eigenvalue with the at least one weight vector to obtain the cardiac potential vector.

18. The system according to claim 17, wherein the machine learning determines the at least one modal vector by sparse representation classification, and the cardiac diagnostic method obtains the at least one weight eigenvalue and the at least one weight vector by coordinate descent.

19. The system according to claim 15, wherein the plurality of operations further comprise:
pre-processing the electrocardiogram signal to obtain a plurality of local potential signals, wherein the number of the plurality of local potential signals is the same as the number of leads of the ECG signal; and
extracting at least one eigenvalue for each of the plurality of local potential signals, and obtaining the body surface potential vector according to the plurality of at least one eigenvalues.

20. The system according to claim 15, wherein the reference heart is a virtual heart, and the plurality of operations further comprise:
creating a three-dimensional virtual heart image according to the abnormal position and the degree of abnormality of the virtual heart.

\* \* \* \* \*